US012520086B2

(12) United States Patent
Yang

(10) Patent No.: US 12,520,086 B2
(45) Date of Patent: Jan. 6, 2026

(54) MICROPHONE AND MICRO-ELECTROMECHANICAL SYSTEM ACOUSTIC SENSOR THEREFOR

(71) Applicant: National Kaohsiung University of Science and Technology, Kaohsiung (TW)

(72) Inventor: Cheng-Ta Yang, Kaohsiung (TW)

(73) Assignee: National Kaohsiung University of Science and Technology, Kaohsiung (TW)

( * ) Notice: Subject to any disclaimer, the term of this patent is extended or adjusted under 35 U.S.C. 154(b) by 595 days.

(21) Appl. No.: 18/085,891

(22) Filed: Dec. 21, 2022

(65) Prior Publication Data

US 2023/0396931 A1 Dec. 7, 2023

(30) Foreign Application Priority Data

Jun. 1, 2022 (TW) .................................. 111120507

(51) Int. Cl.
*H04R 19/00* (2006.01)
*H04R 1/04* (2006.01)

(52) U.S. Cl.
CPC ............. *H04R 19/005* (2013.01); *H04R 1/04* (2013.01); *H04R 2201/003* (2013.01)

(58) Field of Classification Search
None
See application file for complete search history.

(56) References Cited

U.S. PATENT DOCUMENTS

| | | | | |
|---|---|---|---|---|
| 10,334,378 | B2 * | 6/2019 | Boyd | H04R 19/005 |
| 2002/0020053 | A1 * | 2/2002 | Fonash | B81C 1/0038 216/36 |
| 2009/0060232 | A1 * | 3/2009 | Hirade | H04R 19/005 381/174 |
| 2018/0077498 | A1 * | 3/2018 | Yoo | H04R 7/06 |

* cited by examiner

*Primary Examiner* — Nishath Yasmeen
(74) *Attorney, Agent, or Firm* — WPAT, PC

(57) ABSTRACT

A micro-electromechanical system (MEMS) acoustic sensor includes: a silicon substrate layer; an insulation layer, arranged above the silicon substrate layer; two first electrode layers, respectively arranged above the insulation layer and arranged opposite to each other at intervals; and two second electrode layers, respectively arranged above the two first electrode layers. Each of the second electrode layers is provided with at least one support member connected to the corresponding first electrode layer, and forms an acoustic flow channel together with a part of the insulation layer and the two first electrode layers. The each second electrode layer has a front section and a rear section. The front section forms a diverging first cambered surface. The rear section forms a tapered second cambered surface.

19 Claims, 4 Drawing Sheets

MICROPHONE AND MICRO-ELECTROMECHANICAL SYSTEM ACOUSTIC SENSOR THEREFOR

CROSS-REFERENCE TO RELATED APPLICATION

This application claims the benefit of Taiwan Patent Application No. 111120507, filed on 1 Jun. 2022, which is hereby incorporated by reference for all purposes as if fully set forth herein.

BACKGROUND

Technical Field

The present invention mainly relates to an acoustic device, and in particular, to a microphone applied to the acoustic field and a micro-electromechanical system (MEMS) acoustic sensor therefor.

Related Art

There are many kinds of microphones, such as a moving-coil microphone, a condenser microphone, an aluminum ribbon microphone, a carbon microphone, and the like. In addition, in mobile devices such as a mobile phone, an electret (ECM) condenser microphones and a micro-electromechanical system (MEMS) microphone are the most common. The MEMS utilizes the semiconductor process to manufacture micro-mechanical components and complete manufacturing of an acoustic sensor of the microphone through the semiconductor technology such as deposition and selective etching of the material layer.

The main factor affecting the sensitivity of the acoustic sensor of the conventional microphone is thicknesses of the electrode layer and the insulation layer of the manufactured acoustic sensor. Due to over-etching in the etching stage, the electrode layer and the insulation layer are jointly eroded, or upper and lower electrodes are adsorbed together, affecting the yield of the acoustic sensor and reducing the sensitivity of the acoustic sensor.

In view of this, it is necessary to provide a microphone and a micro-electromechanical system acoustic sensor therefor, so as to solve the above problems.

SUMMARY

The present invention is intended to provide a micro-electromechanical system (MEMS) acoustic sensor, so as to increase the amplitude of electrode vibration caused by a sound source.

Another objective of the present invention is to provide a microphone having the MEMS acoustic sensor.

In order to achieve the objective, the present invention provides a MEMS acoustic sensor, including: a silicon substrate layer; at least one insulation layer arranged above the silicon substrate layer; two first electrode layers, respectively arranged above the at least one insulation layer and arranged opposite to each other at intervals; and two second electrode layers, respectively arranged above the two first electrode layers, where each of the second electrode layers is provided with at least one support member connected to the corresponding first electrode layer, the two second electrode layers form an acoustic flow channel together with a part of the insulation layer and the two first electrode layers, the acoustic flow channel has an inlet, the each second electrode layer has a front section closer to the inlet and a rear section, an outer side surface of the front section facing away from the acoustic flow channel forms a diverging first cambered surface along an acoustic flow direction of the acoustic flow channel, and an outer side surface of the rear section facing away from the acoustic flow channel continuously extends from a surface of the first cambered surface, and forms a tapered second cambered surface along the acoustic flow direction.

The present invention provides a MEMS acoustic sensor, including: a silicon substrate layer; at least one insulation layer arranged above the silicon substrate layer; two first electrode layers, respectively arranged above the at least one insulation layer and arranged opposite to each other at intervals; and two second electrode layers, respectively arranged above the two first electrode layers, where each of the second electrode layers is provided with at least one support member connected to the corresponding first electrode layer, the two second electrode layers form an acoustic flow channel together with a part of the insulation layer and the two first electrode layers, the acoustic flow channel has an inlet, the each second electrode layer has a front section closer to the inlet and a rear section, an inner side surface of the front section facing the acoustic flow channel forms a diverging first cambered surface along an acoustic flow direction of the acoustic flow channel, and an inner side surface of the rear section facing the acoustic flow channel continuously extends from a surface of the first cambered surface, and forms a tapered second cambered surface along the acoustic flow direction.

The present invention further provides a microphone, including a housing, having a first stacked region, a second stacked region, and a third stacked region, where the second stacked region is located between the first stacked region and the third stacked region, the first stacked region, the second stacked region, and the third stacked region jointly form an accommodating space, and the housing has a sound hole; the MEMS acoustic sensor, located in the accommodating space, where an inlet of the acoustic flow channel faces the sound hole; and an integrated circuit chip, electrically connected to the MEMS acoustic sensor and located in the accommodating space.

In some embodiments, each of the first electrode layers is composed of at least one electrode layer, a number of the at least one electrode layer is equal to a number of support members of each second electrode layer, and a cross-sectional area of the electrode layer is not less than a cross-sectional area of the support member.

In some embodiments, a number of support members of the each second electrode layer is two, and a through hole is provided between the two support members.

In some embodiments, a junction of the front section and the rear section is opposite to a central position of one of the two support members closer to the inlet.

In some embodiments, a material of the silicon substrate layer is silicon, silicon germanium, silicon carbide, a glass substrate, or a III-V compound substrate.

In some embodiments, a material of the insulation layer is silicon oxide, silicon nitride, silicon oxynitride, a dielectric material with a dielectric constant in a range of 2.5 to 3.9, or a dielectric material with a dielectric constant less than 2.5.

In some embodiments, the two first electrode layers and the two second electrode layers are all made of a conductive material.

In some embodiments, the conductive material is metal, a metal compound, or an ion-doped semiconductor material.

In some embodiments, a through hole is formed in the second stacked region in a radial direction of the accommodating space to form the sound hole.

In some embodiments, a through hole is formed in the third stacked region in an axial direction of the accommodating space to form the sound hole.

The microphone and the MEMS acoustic sensor therefor of the present invention have the following characteristics. By causing the front section of the second electrode layer to form a diverging cambered surface and the rear section of the second electrode layer to form a tapered cambered surface, the two second electrode layers can relatively shake when the sound source passes, resulting in the change in a distance between the two electrode layers, further changing the capacitance value, and finally causing the sound source to converge on an end of the each second electrode layer. Therefore, the microphone and the MEMS acoustic sensor therefor of the present invention have the effects of improving sensitivity and high directivity.

DETAILED DESCRIPTION

Figure 1:
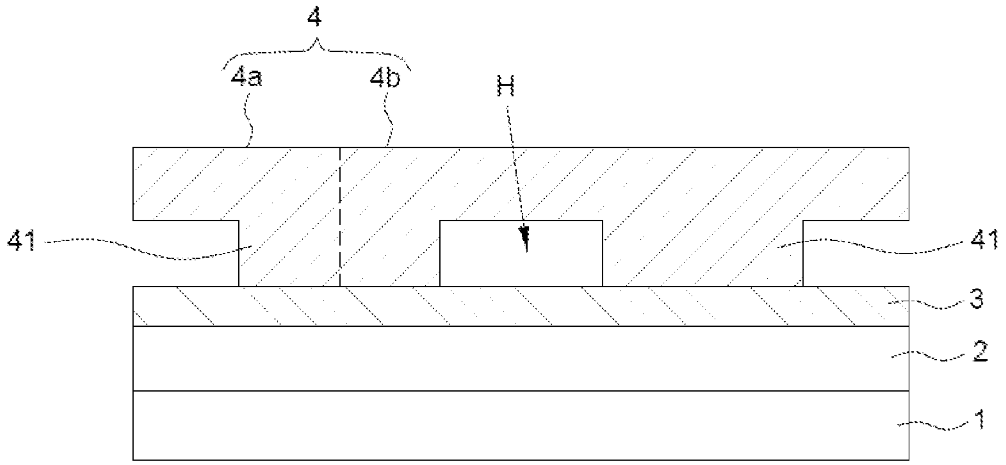
FIG. 1 is a side view of a micro-electromechanical system (MEMS) acoustic sensor according to a first embodiment of the present invention.

Embodiments of the present invention are described in detail below with reference to the accompanying drawings, the accompanying drawings are mainly simplified schematic diagrams, and only exemplify the basic structure of the present invention schematically. Therefore, only the components related to the present invention are shown in the drawings, and are not drawn according to the quantity, shape, and size of the components during actual implementation. During actual implementation, the type, quantity, and proportion of the components may be changed, and the layout of the components may be more complicated.

The directional terms mentioned in present invention, like "above", "below", "front", or "back", refer to the directions in the accompanying drawings. Therefore, the used direction terms are intended to describe and understand the present invention, but are not intended to limit the present invention. In addition, in the specification, unless explicitly described as contrary, the word "include" is understood as referring to including the element, but does not exclude any other elements.

Referring to FIG. 1, a first embodiment of a micro-electromechanical system (MEMS) acoustic sensor of the present invention is provided and includes a silicon substrate layer 1, at least one insulation layer 2, two first electrode layers 3, and two second electrode layers 4. The insulation layer 2 is arranged above the silicon substrate layer 1, the two first electrode layers 3 are arranged above the insulation layer 2, and the two second electrode layers 4 are respectively arranged above the two first electrode layers 3.

In this embodiment, a material of the silicon substrate layer 1 may be silicon, silicon germanium, silicon carbide, a glass substrate, or a III-V compound substrate (for example, a gallium nitride substrate and a gallium arsenide substrate).

The at least one insulation layer 2 is arranged above the silicon substrate layer 1. In this embodiment, a material of the insulation layer 2 may be silicon oxide, silicon nitride, silicon oxynitride, or a dielectric material. The dielectric material may be a low dielectric constant material (a dielectric constant ranges from 2.5 to 3.9) or an ultra-low dielectric constant material (a dielectric constant is less than 2.5).

In this embodiment, the two first electrode layers 3 may be made of a conductive material such as metal, a metal compound, or an ion-doped semiconductor material. The two first electrode layers 3 are respectively arranged above the insulation layer 2 and arranged opposite to each other at intervals.

In this embodiment, the two second electrode layers 4 may also be made of a conductive material such as metal, a metal compound, or an ion-doped semiconductor material. The two second electrode layers 4 are respectively arranged above the two first electrode layers 3. Each of the second electrode layers 4 has at least one support member 41 connected to the corresponding first electrode layer 3.

Figure 2:
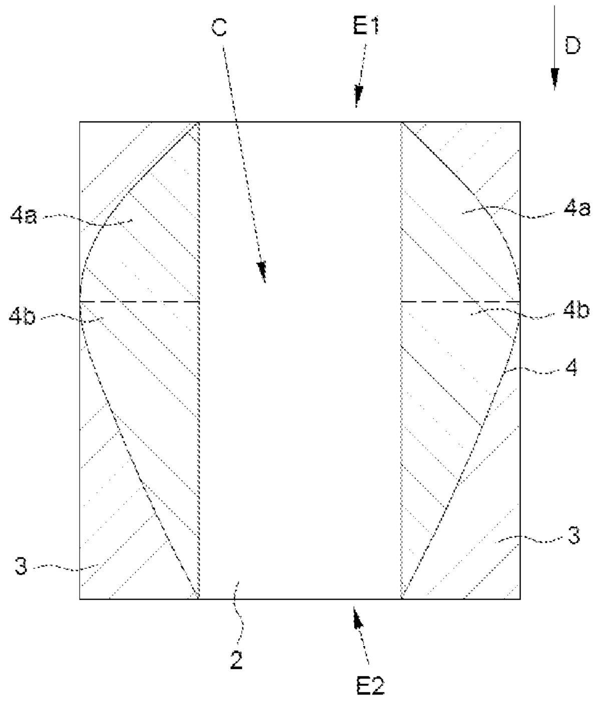
FIG. 2 is a top view of the MEMS acoustic sensor according to a first embodiment of the present invention.

Referring to FIG. 2, the two first electrode layers 3, a part of the insulation layer 2, and the two second electrode layers 4 jointly form an acoustic flow channel C. Two ends of the acoustic flow channel C respectively have an inlet E1 and an outlet E2. The each second electrode layer 4 has a front section **4*a* closer to the inlet E1 and a rear section 4*b* closer to the outlet E2. An outer side surface of the front section 4*a* facing away from the acoustic flow channel C forms a diverging first cambered surface along an acoustic flow direction D of the acoustic flow channel C, and an outer side surface of the rear section 4*b* facing away from the acoustic flow channel C continuously extends from a surface of the first cambered surface, and forms a tapered second cambered surface along the acoustic flow direction D. On the other hand, the front section 4*a* and the rear section 4*b*** each face an inner side surface of the acoustic flow channel C, so as to form a plane or a curved surface. This is not limited thereto.

Referring to FIG. 1, one support member or a plurality of support members 41 of the each second electrode layer 4 may be arranged. When a plurality of support members 41 is arranged, a through hole H is formed between any two support members 41.

For example, when a number of the support members 41 is two, a through hole H is formed between the two support members 41. A junction of the front section **4*a* and the rear section 4*b* is opposite to a central position of one of the two support members 41 closer to the inlet E1**.

Figure 3:
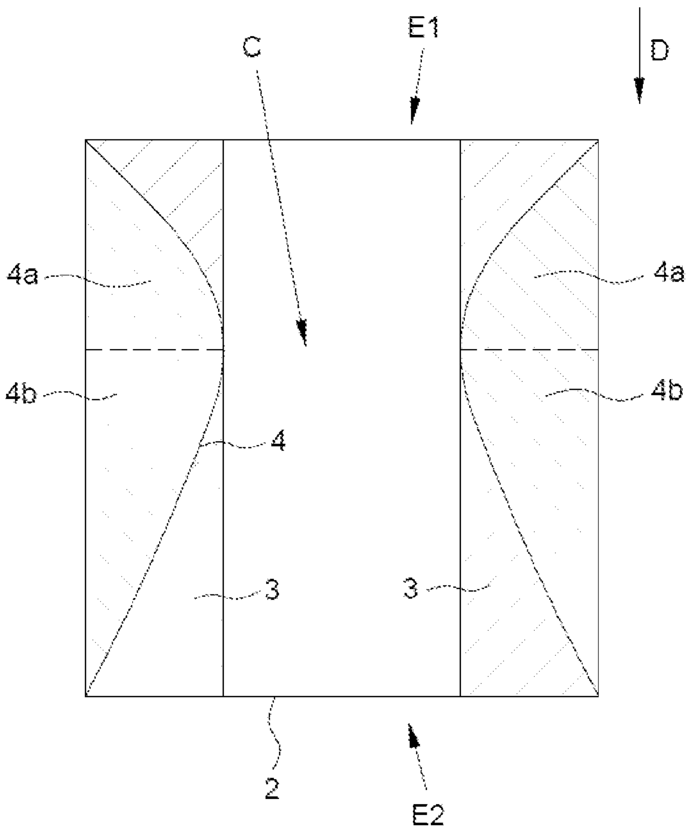
FIG. 3 is a top view of the MEMS acoustic sensor according to a second embodiment of the present invention.

Referring to FIG. 3, a second embodiment of the MEMS acoustic sensor of the present invention is provided. Compared to the first embodiment, an inner side surface of the front section **4*a* facing the acoustic flow channel C forms a diverging first cambered surface along an acoustic flow direction D of the acoustic flow channel C, and an inner side surface of the rear section 4*b* facing the acoustic flow channel C continuously extends from a surface of the first cambered surface, and forms a tapered second cambered surface along the acoustic flow direction D. On the other hand, the front section 4*a* and the rear section 4*b*** each face away from an outer side surface of the acoustic flow channel C, so as to form a plane or a curved surface. This is not limited thereto.

Figure 4:
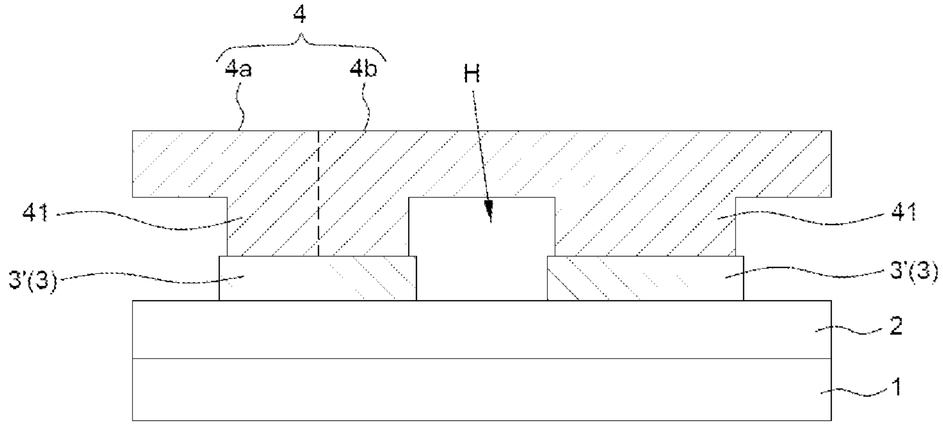
FIG. 4 is a side view of the MEMS acoustic sensor according to a third embodiment of the present invention.
Figure 5:
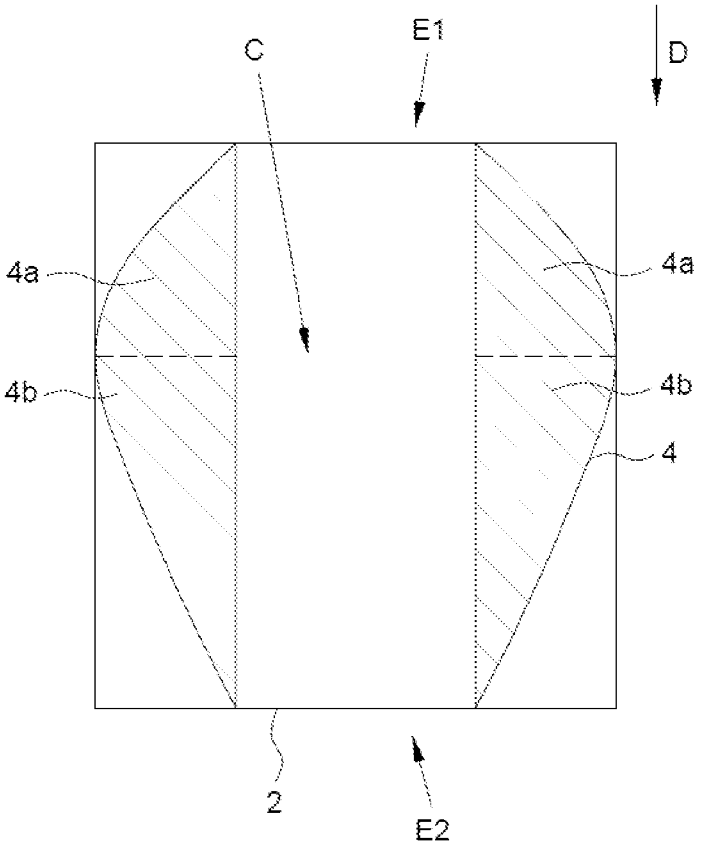
FIG. 5 is a top view of the MEMS acoustic sensor according to a third embodiment of the present invention.

Referring to FIG. 4 and FIG. 5, a third embodiment of the MEMS acoustic sensor of the present invention is provided. Compared to the first embodiment, each first electrode layer 3 is composed of at least one electrode layer 3', a number of the at least one electrode layer 3' is equal to a number of support members 41 of each second electrode layer 4, and a cross-sectional area of the electrode layer 3' is not less than a cross-sectional area of the support member 41. For example, when the number of support members 41 of the two second electrode layers 4 is two, a total number of the electrode layers 3' is four.

Figure 6:
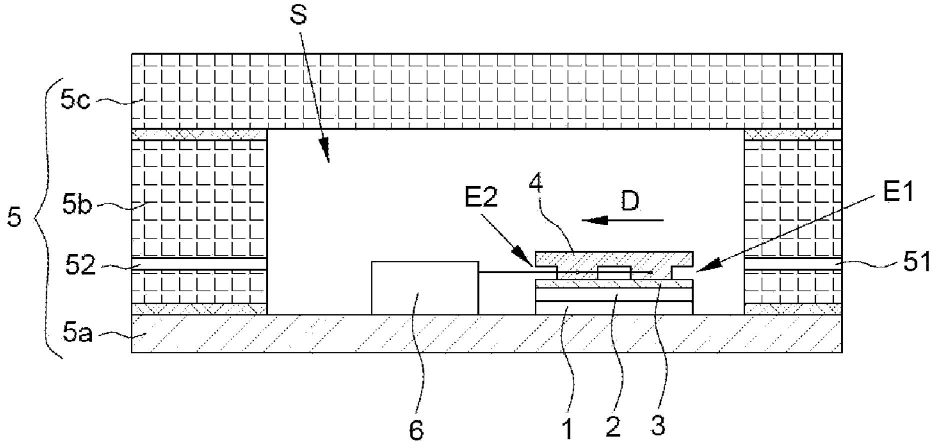
FIG. 6 is a side view of a microphone according to the present invention.

Referring to FIG. 6, a preferred embodiment of the microphone of the present invention is provided and includes a housing 5, the MEMS acoustic sensor, and an integrated circuit chip 6. The MEMS acoustic sensor and the integrated circuit chip 6 are respectively arranged inside the housing 5.

The housing 5 has a first stacked region 5*a*, a second stacked region 5*b*, and a third stacked region 5*c*. The second stacked region 5*b* is located between the first stacked region 5*a* and the third stacked region 5*c*. The first stacked region 5*a*, the second stacked region 5*b*, and the third stacked region 5*c* jointly form an accommodating space S. In this embodiment, the first stacked region 5*a* may be made of a conductive material or a printed circuit board, and the second stacked region 5*b* and the third stacked region 5*c* may be made of various plastic, metal, ceramic, a bakelite plate, glass fiber, or ceramic materials. The second stacked region 5*b* and the third stacked region 5*c* may be separated from each other or integrally formed.

The housing 5 has a sound hole 51 and a sound expelling hole 52. The sound hole 51 is used for external sound to enter the accommodating space S, and the sound expelling hole 52 is used for expelling the sound inside the housing 5, so that the sound will not generate echo in the housing 5 and affects the performance of the microphone. In this embodiment, a through hole may be formed in the second stacked region 5*b* in a radial direction of the accommodating space S according to the acoustic flow direction D of the acoustic flow channel C to extend through left and right surfaces of the corresponding second stacked region 5*b*, so as to form the sound hole 51, so that the sound hole 51 faces the inlet E1 of the acoustic flow channel C.

In another embodiment, a through hole may be formed in the third stacked region 5*c* in an axial direction of the accommodating space S to extend through upper and lower surfaces of the corresponding third stacked region 5*c*, so as to form the sound hole 51, so that the sound hole 51 faces the inlet E1 of the acoustic flow channel C. It is to be noted that in this embodiment, the arrangement direction of the MEMS acoustic sensor is such that the inlet E1 of the acoustic flow channel C faces the third stacked region 5*c*, so that the formed sound hole 51 can face the inlet E1.

On the other hand, an other through hole may be formed in the second stacked region 5*b* in a radial direction of the accommodating space S to extend through left and right surfaces of the corresponding second stacked region 5*b*, so as to form the sound expelling hole 52. Alternatively, an other through hole may be formed in the third stacked region 5*c* in an axial direction of the accommodating space S to extend through upper and lower surfaces of the corresponding third stacked region 5*c*, so as to form the sound expelling hole 52. Preferably, the sound expelling hole 52 is located on an opposite side of the sound hole 51.

Figure 7:
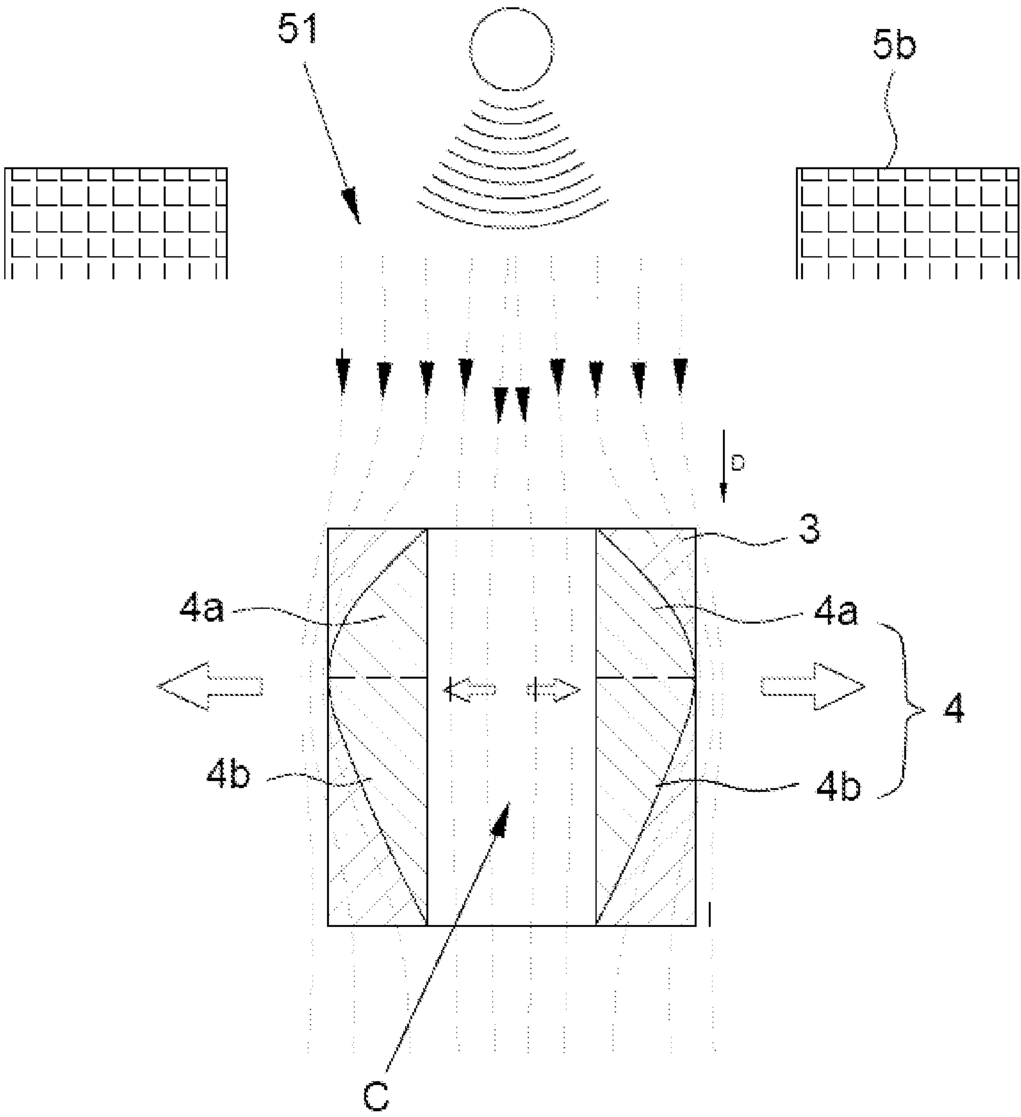
FIG. 7 is a state diagram of a flow direction of sound in use of the microphone of the present invention.

Referring to FIG. 7, in use of the microphone of the present invention, the sound source enters the accommodating space S through the sound hole 51. A part of the sound source passes through the acoustic flow channel C, and an other part of the sound source is transmitted along an outer side surface of each second electrode layer 4 and away from the sound hole 51. Then, the sound source transmitted along the outer side surface of each second electrode layer 4 finally converges on an end of the each second electrode layer 4 (a part of the rear section 4*b* farthest from the front section 4*a*). Therefore, compared with the inner side surface, the outer side surface of each second electrode layer 4 has a faster air flow speed and a lower pressure, so that the two second electrode layers 4 can shake relatively, thereby improving the sensitivity of the MEMS acoustic sensor of the present invention and having a high directivity.

Carrying on with the above, according to the microphone and the MEMS acoustic sensor therefor of the present invention, by causing the front section of the second electrode layer to form a diverging cambered surface and the rear section of the second electrode layer to form a tapered cambered surface, the two second electrode layers can relatively shake when the sound source passes, resulting in the change in a distance between the two electrode layers, further changing the capacitance value, and finally causing the sound source to converge on ends of the second electrode layers. Therefore, the microphone and the MEMS acoustic sensor therefor of the present invention have the effects of improving sensitivity and high directivity.

The above embodiments merely exemplify the principles, features, and effects of the present invention, but are not intended to limit the implementation scope of the present invention. A person skilled in the art can modify or change the above embodiments without departing from the spirit and scope of the present invention. Any equivalent change or modification made using the contents disclosed by the present invention shall fall within the scope of the claims below.

What is claimed is:

1. A micro-electromechanical system (MEMS) acoustic sensor, comprising:

a silicon substrate layer;

at least one insulation layer, arranged above the silicon substrate layer;

two first electrode layers, respectively arranged above the at least one insulation layer and arranged opposite to each other at intervals; and two second electrode layers, respectively arranged above the two first electrode layers, wherein each of the second electrode layers is provided with at least one support member connected to the corresponding first electrode layer, the two second electrode layers form an acoustic flow channel together with a part of the insulation layer and the two first electrode layers, the acoustic flow channel has an inlet, the each second electrode layer has a front section closer to the inlet and a rear section, an outer side surface of the front section facing away from the acoustic flow channel forms a diverging first cambered surface along an acoustic flow direction of the acoustic flow channel, and an outer side surface of the rear section facing away from the acoustic flow channel continuously extends from a surface of the first cambered surface, and forms a tapered second cambered surface along the acoustic flow direction.

2. The MEMS acoustic sensor according to claim 1, wherein each of the first electrode layers is composed of at least one electrode layer, a number of the at least one electrode layer is equal to a number of support members of the each second electrode layer, and a cross-sectional area of the electrode layer is not less than a cross-sectional area of the support member.

3. The MEMS acoustic sensor according to claim 1, wherein a number of support members of the each second electrode layer is two, and a through hole is provided between the two support members.

4. The MEMS acoustic sensor according to claim 3, wherein a junction of the front section and the rear section is opposite to a central position of one of the two support members closer to the inlet.

5. The MEMS acoustic sensor according to claim 1, wherein a material of the silicon substrate layer is silicon, silicon germanium, silicon carbide, a glass substrate, or a III-V compound substrate.

6. The MEMS acoustic sensor according to claim 1, wherein a material of the insulation layer is silicon oxide, silicon nitride, silicon oxynitride, a dielectric material with a dielectric constant in a range of 2.5 to 3.9, or a dielectric material with a dielectric constant less than 2.5.

7. The MEMS acoustic sensor according to claim 1, wherein the two first electrode layers and the two second electrode layers are all made of a conductive material.

8. The MEMS acoustic sensor according to claim 7, wherein the conductive material is metal, a metal compound, or an ion-doped semiconductor material.

9. A micro-electromechanical system (MEMS) acoustic sensor, comprising:

- a silicon substrate layer;
- at least one insulation layer, arranged above the silicon substrate layer;
- two first electrode layers, respectively arranged above the at least one insulation layer and arranged opposite to each other at intervals; and
- two second electrode layers, respectively arranged above the two first electrode layers, wherein each of the second electrode layers is provided with at least one support member connected to the corresponding first electrode layer, the two second electrode layers form an acoustic flow channel together with a part of the insulation layer and the two first electrode layers, the acoustic flow channel has an inlet, the each second electrode layer has a front section closer to the inlet and a rear section, an inner side surface of the front section facing the acoustic flow channel forms a diverging first cambered surface along an acoustic flow direction of the acoustic flow channel, and an inner side surface of the rear section facing the acoustic flow channel continuously extends from a surface of the first cambered surface, and forms a tapered second cambered surface along the acoustic flow direction.

10. The MEMS acoustic sensor according to claim 9, wherein each of the first electrode layers is composed of at least one electrode layer, a number of the at least one electrode layer is equal to a number of support members of the each second electrode layer, and a cross-sectional area of the electrode layer is not less than a cross-sectional area of the support member.

11. The MEMS acoustic sensor according to claim 9, wherein a number of support members of the each second electrode layer is two, and a through hole is provided between the two support members.

12. The MEMS acoustic sensor according to claim 11, wherein a junction of the front section and the rear section is opposite to a central position of one of the two support members closer to the inlet.

13. The MEMS acoustic sensor according to claim 9, wherein a material of the silicon substrate layer is silicon, silicon germanium, silicon carbide, a glass substrate, or a III-V compound substrate.

14. The MEMS acoustic sensor according to claim 9, wherein a material of the insulation layer is silicon oxide, silicon nitride, silicon oxynitride, a dielectric material with a dielectric constant in a range of 2.5 to 3.9, or a dielectric material with a dielectric constant less than 2.5.

15. The MEMS acoustic sensor according to claim 9, wherein the two first electrode layers and the two second electrode layers are all made of a conductive material.

16. The MEMS acoustic sensor according to claim 15, wherein the conductive material is metal, a metal compound, or an ion-doped semiconductor material.

17. A microphone, comprising:

- a housing, having a first stacked region, a second stacked region, and a third stacked region, wherein the second stacked region is located between the first stacked region and the third stacked region, the first stacked region, the second stacked region, and the third stacked region jointly form an accommodating space, and the housing has a sound hole;
- the MEMS acoustic sensor according to any of claim 1, located in the accommodating space, wherein an inlet of the acoustic flow channel faces the sound hole; and
- an integrated circuit chip, electrically connected to the MEMS acoustic sensor and located in the accommodating space.

18. The microphone according to claim 17, wherein a through hole is formed in the second stacked region in a radial direction of the accommodating space to form the sound hole.

19. The microphone according to claim 17, wherein a through hole is formed in the third stacked region in an axial direction of the accommodating space to form the sound hole.

* * * * *